United States Patent
Schilling et al.

(10) Patent No.: US 6,846,850 B2
(45) Date of Patent: Jan. 25, 2005

(54) RIGID POLYURETHANE FOAMS WITH IMPROVED PROPERTIES

(75) Inventors: Steven L. Schilling, Pittsburg, PA (US); Edward E. Ball, Weirton, WV (US); Kevin J. Elsken, Canonsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

(21) Appl. No.: 10/349,368

(22) Filed: Jan. 22, 2003

(65) Prior Publication Data

US 2004/0143027 A1 Jul. 22, 2004

(51) Int. Cl.$^7$ .............................................. C08G 18/48
(52) U.S. Cl. ...................... 521/174; 521/130; 521/131; 521/170; 521/172; 521/173
(58) Field of Search ................. 521/130, 131, 521/170, 174, 172, 173

(56) References Cited

U.S. PATENT DOCUMENTS

| | | | |
|---|---|---|---|
| 3,085,065 A | 4/1963 | Wismer et al. | |
| 3,153,002 A | 10/1964 | Wismer et al. | |
| 3,222,357 A | 12/1965 | Wismer et al. | |
| 4,430,490 A | 2/1984 | Doerge | 528/77 |
| 4,943,597 A | 7/1990 | Grunbauer et al. | 521/167 |
| 5,426,127 A | 6/1995 | Doerge | 521/131 |
| 5,461,084 A | 10/1995 | Doerge | 521/167 |
| 5,496,867 A | 3/1996 | Sommerfeld et al. | 521/131 |
| 5,539,006 A | 7/1996 | Doerge et al. | 521/98 |
| 5,798,533 A | 8/1998 | Fishback et al. | |
| 5,856,679 A * | 1/1999 | Barthelemy et al. | 252/182.24 |
| 5,889,066 A * | 3/1999 | Doerge | 521/114 |
| 6,086,784 A | 7/2000 | Barthelemy et al. | |
| 6,121,338 A * | 9/2000 | Colman | 521/131 |
| 6,207,725 B1 | 3/2001 | Sieker et al. | 521/172 |
| 6,248,802 B1 * | 6/2001 | Singh et al. | 521/131 |
| 6,284,812 B1 * | 9/2001 | Rotermund et al. | 521/174 |
| 6,306,920 B1 * | 10/2001 | Heinemann et al. | 521/174 |
| 6,335,378 B1 * | 1/2002 | Colman | 521/131 |
| 6,339,110 B1 | 1/2002 | Cappella et al. | 521/131 |
| 6,346,205 B2 | 2/2002 | Sieker et al. | 252/182.24 |
| 6,380,275 B1 | 4/2002 | Kruecke et al. | 521/131 |
| 6,433,032 B1 | 8/2002 | Hamilton | 521/159 |
| 6,590,005 B2 * | 7/2003 | Singh et al. | 521/131 |

FOREIGN PATENT DOCUMENTS

GB       947 482       1/1964

OTHER PUBLICATIONS

Polyurethanes World Congress, Sep. 29–Oct. 2, 1987, pp. 59–66, K.Y. Dishart and, J.A. Creazzo, "The DuPont Program on Fluorocarbon Alternative Blowing Agents for Polyurethane Foams".

Patent Abstracts of Japan vol. 0182, No. 68 (C–1202), May 23, 1994 (May 23, 1994) & JP 6 041268 A (Achilles Corp), Feb. 15, 19994 (Feb. 15, 1994) abstract.

* cited by examiner

*Primary Examiner*—John M. Cooney, Jr.
(74) *Attorney, Agent, or Firm*—Joseph C. Gil; John E. Mrozinski, Jr.

(57) ABSTRACT

In the process of the present invention, an organic polyisocyanate is reacted with a sorbitol-based polyether polyol having a number average molecular weight of from about 400 to about 1500, in the presence of a pentafluoropropane blowing agent, and a catalyst.

2 Claims, No Drawings

RIGID POLYURETHANE FOAMS WITH IMPROVED PROPERTIES

BACKGROUND OF THE INVENTION

The present invention relates to a process for the production of rigid polyurethane foams having improved demold and outstanding insulation properties.

Processes for the production of rigid polyurethane foams are known. Sucrose-based polyols are of particular interest as the primary isocyanate-reactive reactant because of their relatively low cost, high functionality and because they are relatively simple to produce. Processes for producing such sucrose-based polyols are disclosed, for example, in U.S. Pat. Nos. 3,085,085; 3,153,002; 3,222,357; 4,430,490; and 5,539,006. Each of these patents teaches that sucrose-based polyols are useful in the production of polyurethane foams.

At the present time, a major concern of foam producers, particularly rigid foam producers, is the development of rigid foam systems in which the chlorofluorocarbon blowing agent is replaced with a more environmentally acceptable blowing agent. HCFCs (i.e., hydrogen containing chlorofluorocarbons), HFCs (hydrogen containing fluorocarbons), and hydrocarbons such as n-pentane cyclopentane, isopentane and blends of these blowing agents are presently considered to be possible alternatives.

Dishart et al's paper entitled "The DuPont Program on Fluorocarbon Alternative Blowing Agents for Polyurethane Foams", Polyurethanes World Congress 1987, pages 59–66 discusses the investigation of various HCFCs as possible blowing agents for rigid polyurethane foams.

Various references have described the use of pentafluoropropanes as blowing agents in producing polyurethane foams. See, e.g., U.S. Pat. Nos. 5,496,866; 5,496,867; 5,426,127; 5,461,084; and 5,889,066.

Finally, several references have broadly suggested the use of sorbitol-based polyethers in producing polyurethane foams. See, e.g., U.S. Pat. Nos. 4,943,597; 5,798,533; 6,207,725; 6,284,812; 6,306,920; 6,339,110; 6,346,205; 6,380,275; and 6,433,032; and an article published in 2001 by Colvin, entitled "New Blowing Agents for Insulated Panels." Of these references, U.S. Pat. Nos. 6,284,812; 6,306,920; and 6,380,275 and the Colvin article broadly suggest that sorbitol-based polyethers may be used with HFC-245fa.

A process in which for preparing a rigid foam having good physical properties, particularly good demold and insulating properties would, therefore, be advantageous. More particularly, it would be advantageous to produce a rigid foam from a pentafluoropropane blowing agent having lower freeze stable density at a lower overpack and improved k-factor and with other physical properties being at least equivalent to foams produced from sucrose-based polyethers.

DESCRIPTION OF THE INVENTION

The present invention is directed to a process for the production of rigid polyurethane foams having excellent demold and insulation properties and to the foams produced by this process.

In the process of the present invention, an organic polyisocyanate is reacted with a sorbitol-based polyether polyol having a number average molecular weight of from about 400 to about 1500, in the presence of a pentafluoropropane blowing agent, and a catalyst. The foams produced according to the present invention exhibit lower K-factors, lower densities, lower mold lid opening values at freeze stable densities and comparable compressive strength (even though the core density is lower), when compared to foams produced from equivalent sucrose-based polyether polyols.

The sorbitol-based polyether is preferably an ethylene oxide, propylene oxide polyether having a number average molecular weight of from about 400 to about 1500, an ethylene oxide content of from about 10 to about 50% by weight, preferably from about 20 to about 40% by weight and a propylene oxide content of from about 50 to about 90% by weight, preferably from about 60 to about 80% by weight, with the % s by weight being based on the total amount of ethylene oxide and propylene oxide used.

The blowing agent is preferably a pentafluoropropane selected from the group consisting of 1,1,2,2,3-pentafluoropropane (HFC-245ca), 1,1,2,3,3-pentafluoropropane (HFC-245ea), 1,1,1,2,3-pentafluoropropane (HFC-245eb) and 1,1,1,3,3-pentafluoropropane (HFC-245fa), with 1,1,1,3,3-pentafluoropropane being most preferred. The blowing agent is generally used in an amount of from about 5 to about 20% by weight (and preferably from about 8 to about 16% by weight) based on the total weight of the foam formulation.

The polyol and isocyanate are reacted at an isocyanate index of from about 0.9 to about 3.1, preferably from about 1.05 to about 1.55. The foams of the invention generally have K-factors which are lower than the K-factors of the foams produced from equivalent sucrose-based polyether polyols. Typically, the foams produced herein will have K-factors of less than 0.140 Btu-in./hr.ft$^{2o}$ F. measured at 75° F. The preferred foams of the invention will have K-factors of less than 0.135 and, in some instances, even less than 0.130. If a K-factor of less than 0.130 is not required, it could still be advantageous to use a sorbitol-based polyol and use a lower amount of blowing agent to reduce cost.

Any organic polyisocyanate may be used in the process of the present invention. Suitable isocyanates include aromatic, aliphatic, and cycloaliphatic polyisocyanates and combinations thereof. Examples of useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, hexahydrotoluene diisocyanate and its isomers, 1,5-naphthylene diisocyanate, 1-methyl-phenyl-2,4-phenyl diisocyanate, 4,4'-diphenyl-methane diisocyanate, 2,4'-diphenyl-methane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates such as 2,4,6-toluene triisocyanate; and polyisocyanates such as 4,4'-dimethyl-diphenyl-methane-2,2', 5,5'-tetraisocyanate and the polymethylene polyphenylpolyisocyanates.

Undistilled or a crude polyisocyanate may also be used in making polyurethanes by the process of the present invention. The crude toluene diisocyanate obtained by phosgenating a mixture of toluene diamines and the crude diphenylmethane diisocyanate obtained by phosgenating crude diphenylmethanediamine are examples of suitable crude polyisocyanates.

Preferred polyisocyanates for the production of rigid polyurethanes are methylene-bridged polyphenyl polyisocyanates and prepolymers of methylene-bridged polyphenyl polyisocyanates having an average functionality of from about 1.8 to about 3.5 (preferably from about 2.0 to about 3.1) isocyanate moieties per molecule and an NCO content of from about 28 to about 34% by weight, due to their ability to cross-link the polyurethane.

The polyisocyanate is generally used in an amount such that the isocyanate index (i.e., the ratio of equivalents of isocyanate groups to equivalents of isocyanate-reactive groups) is from about 0.9 to about 3.0, preferably from about 1.0 to about 1.5.

The polyols employed in the process of the present invention are polyether polyols prepared by reacting sorbitol and optionally other initiators (with or without water) with ethylene oxide and/or propylene oxide in the presence of an alkaline catalyst. The product is then treated with an acid, preferably a hydroxy-carboxylic acid so as to neutralize the alkaline catalyst. U.S. Pat. No. 4,430,490 (which discloses a suitable process for such neutralization) is incorporated herein by reference. The acid used to neutralize the alkaline catalyst present in the polyether polyol may be any acid which will result in an acidified polyether polyol having a pH of from about 4.0 to about 8.0, preferably from 5.5 to 7.5. Hydroxycarboxylic acids are the preferred neutralizing acids. The total amount of alkylene oxide used is selected so that the resultant polyol will have a number average molecular weight of from about 400 to about 1500, preferably from about 600 to about 1200.

It is most preferred that the sorbitol-based polyether contain both ethylene oxide and propylene oxide residues. In this case, it is preferred that the sorbitol first be reacted with ethylene oxide and then propylene oxide. The ethylene oxide is generally used in an amount of from about 10 to about 50%, preferably from about 20 to about 40% by weight of the total alkylene oxide used. The propylene oxide is generally used in an amount of from about 50 to about 90% by weight, and preferably from about 60 to about 80% by weight of the total alkylene oxide employed.

Other polyols (e.g., i) polyether polyols which are based on hydroxy-functional initiators other than sorbitol or are based on organic polyamines and ii) polyester polyols) known to be useful in the production of rigid polyurethane foams may, optionally, be used in combination with the required sorbitol-based polyether polyol. When used, these optional polyols are present in an amount which is no greater than 90%, preferably from about 10 to about 85% and most preferably from about 25 to about 80% by weight of the total amount of polyol used (i.e., the total amount of sorbitol-based polyol and optional polyols).

Water may optionally be included in the reaction mixtures of the present invention. When used, the water is generally present in an amount of from about 0.2% to about 2.0%, and preferably from about 0.4 to about 1.5% by weight based on the total foam formulation.

Any of the catalysts known to be useful in the production of rigid polyurethane foams may be employed in the process of the present invention. Tertiary amine catalysts are particularly preferred. Specific examples of suitable catalysts include: pentamethyldiethylenetriamine, N-N-dimethylcyclohexylamine, N,N', N"-dimethylamino-propylhexahydrotriazine, and tetramethylethylenediamine. Pentamethyl-diethylenetriamine and N,N',N"-dimethylamino-propylhexahydrotriazine are particularly preferred. Organometallic catalysts (such as organotin compounds) of the type known in the urethane art can also be used.

Other materials which may optionally be included in the foam-forming mixtures of the present invention include: chain extenders, crosslinking agents, surfactants, pigments and/or colorants, fillers, antioxidants, flame retardants, and stabilizers.

Having thus described our invention, the following examples are given as being illustrative thereof. All parts and percentages given in these examples are parts by weight and percentages by weight, unless otherwise indicated.

EXAMPLES

The materials used in the following examples were as follows:

POLYOL A: a sucrose-based polyether polyol having an hydroxyl number of about 470, prepared by first reacting a sucrose/propylene glycol/water slurry with ethylene oxide and then propylene oxide in the presence of KOH catalyst such that ethylene oxide comprised about 30% and propylene oxide comprised about 70% of the total alkylene oxide used. The polyol was then neutralized with lactic acid and distilled to remove the residual water.

POLYOL B: a sorbitol-based polyether polyol having an hydroxyl number of about 470, prepared by first reacting sorbitol with ethylene oxide and then propylene oxide in the presence of KOH catalyst such that ethylene oxide comprised about 30% and propylene oxide comprised about 70% of the total alkylene oxide used. The polyol was then neutralized with lactic acid and distilled to remove the residual water.

POLYOL C: an aromatic amine-initiated polyether polyol having an OH number of 395 and an average OH functionality of about 4, commercially available from Bayer Corporation as Multranol 8114.

POLYOL D: an aromatic polyester polyol having an OH number of 240, commercially available from Stepan Company under the name Stepanol PS 2502a.

Mondur 1515: modified polymeric methylenediphenyl diisocyanate having an NCO content of about 30.5, commercially available from Bayer Corporation under the name Mondur 1515.

DC-5357: a silicon surfactant available from Air Products and Chemicals, Inc. under the name Dabco DC-5537.

PDT: pentamethyldiethylenetriamine

TPT: 1,3,5-tris(3-(dimethylamino)propyl)hexahydro-s-triazine

The foams were prepared by reacting the components listed in the following table in the amounts listed by mixing the polyols, catalysts, surfactant, water and blowing agent (HFC-245fa) to form a masterbatch. The masterbatch and isocyanate were then mixed using a Hennecke high-pressure foam machine equipped with an MQ 12-2 mixhead. The liquid output was maintained at a constant 60 lbs./min. and the recycle and pour pressures were held at 1500 psig. The minimum fill density was determined from foam panels poured into a temperature controlled Brett mold at 120° F. (49° C.) with an internal volume of 79 inches (200 cm) by 8 inches (20 cm) by 2 inches (5 cm).

Panels were then prepared at four higher densities at 0.10, 0.15, 0.20 and 0.25 lb./ft$^3$ over the minimum fill density. The lid opening of the Brett mold was determined on each of these panels. The top half of each panel was cut into ten sections of about 4 inches (10 cm) and subjected to −4° F. (−20° C.) for at least 16 hours. The panel with the lowest density, which exhibited no significant dimensional change, was considered to be freeze stable. Additional panels for foam properties were all prepared at this "freeze stable density" ("FSD" in the following table).

The K-factor was determined using a LaserComp 300 k-Factor instrument with 8×8×1 inch core foam samples. A mean temperature of 75° F. was used.

The formulations tested and the results obtained were as indicated in the table.

TABLE

|  | Control | Example 1 |
|---|---|---|
| POLYOL A | 14.00 | — |
| POLYOL C | 38.50 | 38.50 |
| POLYOL D | 17.51 | 17.51 |
| POLYOL B | — | 14.00 |
| PDT | 2.83 | 2.83 |
| TPT | 1.06 | 1.06 |
| Polycat-41 | 0.53 | 0.53 |
| WATER | 0.90 | 0.90 |
| HFC 245fa | 24.67 | 24.67 |
| Total | 100 | 100 |
| Mondur 1515 | 98.2 | 98.2 |
| Min. Fill (pcf) | 1.88 | 1.88 |
| FSD (pcf) | 2.08 | 2.02 |
| % Overpack | 10.60% | 7.40% |
| 3 Minute Demold Lid Opening at FSD (in) | 0.086 | 0.068 |
| Fox k-factor | 0.130 ± 0.001 | 0.128 ± 0.001 |
| 8" Fox K/Molded Density 75° F. Average Compressive Strength (Psi) | | |
| Perpendicular | 21.2 ± 0.5 (5) | 21.5 ± 0.4 (3) |
| Parallel | 34.2 ± 0.7 (5) | 33.1 ± 0.5 (3) |
| Compressive Strength (Psi) | | |
| Perpendicular | 21.2 ± 0.5 | 21.5 ± 0.4 |
| Parallel | 34.2 ± 0.7 | 33.1 ± 0.5 |
| Core Density (pcf) | 1.89 ± 0.02 | 1.81 ± 0.01 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a rigid polyurethane foam comprising reacting:

a) an organic polyisocyanate with b) a sorbitol-based polyether polyol having a number average molecular weight of from about 400 to about 1500, b1) an o-toluene diamine-based polyether polyol, b2) a polyester polyol, and b3) water in the presence of c) a pentafluoropropane blowing agent, selected from the group consisting of 1,1,2,2,3-pentafluoropropane, 1,1,2,3,3-pentafluoropropane, 1,1,1,2,3-pentafluoropropane and 1,1,1,3,3-pentafluoropropane, d) a tertiary amine catalyst.

2. The process of claim 1, wherein said sorbitol-based polyether polyol is an ethylene, propylene oxide polyether polyol.

* * * * *